US006883120B1

(12) United States Patent
Banga

(10) Patent No.: US 6,883,120 B1
(45) Date of Patent: Apr. 19, 2005

(54) COMPUTER ASSISTED AUTOMATIC ERROR DETECTION AND DIAGNOSIS OF FILE SERVERS

(75) Inventor: Gaurav Banga, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 09/456,027

(22) Filed: Dec. 3, 1999

(51) Int. Cl.[7] .............................................. G06F 11/00
(52) U.S. Cl. ............................ 714/47; 714/4; 714/37
(58) Field of Search ........................... 714/3, 4, 19, 20, 714/25, 26, 37, 47

(56) References Cited

U.S. PATENT DOCUMENTS

| | | | |
|---|---|---|---|
| T0,955,010 I4 | * 2/1977 | Ragonese et al. ............. | 714/47 |
| 4,296,464 A | * 10/1981 | Woods et al. ................ | 710/308 |
| 4,825,354 A | 4/1989 | Agrawal et al. ............ | 364/200 |
| 4,937,763 A | 6/1990 | Mott .......................... | 364/550 |
| 4,984,272 A | 1/1991 | McIlroy et al. ............... | 380/25 |
| 5,067,099 A | 11/1991 | McCown et al. ............ | 364/550 |
| 5,101,402 A | * 3/1992 | Chiu et al. .................. | 709/224 |
| 5,107,500 A | 4/1992 | Wakamoto et al. | |
| 5,109,350 A | * 4/1992 | Henwood et al. ........... | 702/186 |
| 5,113,442 A | 5/1992 | Moir ........................... | 380/25 |
| 5,144,659 A | 9/1992 | Jones ........................... | 380/4 |
| 5,193,151 A | * 3/1993 | Jain ............................. | 370/230 |
| 5,202,983 A | 4/1993 | Orita et al. .................. | 395/600 |
| 5,222,217 A | 6/1993 | Blount et al. ................ | 395/325 |
| 5,283,830 A | 2/1994 | Hinsley et al. ............... | 380/25 |
| 5,485,574 A | * 1/1996 | Bolosky et al. ............. | 709/319 |
| 5,506,955 A | * 4/1996 | Chen et al. ................... | 714/26 |
| 5,553,235 A | * 9/1996 | Chen et al. ................... | 714/20 |
| 5,572,711 A | 11/1996 | Hirsch et al. ................ | 395/500 |
| 5,604,862 A | 2/1997 | Midgely et al. ............. | 395/182 |
| 5,617,568 A | 4/1997 | Ault et al. ................... | 395/612 |
| 5,621,663 A | 4/1997 | Skagerling | |

(Continued)

FOREIGN PATENT DOCUMENTS

| | | | |
|---|---|---|---|
| EP | 0537098 | 4/1993 | |
| JP | 403131143 a | * 6/1991 | ........... H04L/12/56 |
| WO | WO 93/00632 A1 | 1/1993 | |
| WO | WO 02/084920 A2 | 10/2002 | |

OTHER PUBLICATIONS

Norton et al., "Peter Norton's Complete Guide to Norton SystemWorks 2.0", 1999, Sams, chs. 3 and 13.*

Cowart, "Mastering Windows 98", 1998, Sybex, ch. 29 overview.*

Stevens, "TCP/IP Illustrated, vol. 1: The Protcols", 1994, Addison Wesley Longman, Inc., pp. 33 and 231–233.*

Miller et al., "Auto–Negotation" from "LAN Technologies Explained", Digital Press, 2000.*

Borg et al. "Fault Tolerance under UNIX." ACM Transactions on Computer Systems, Feb. 1989, pp. 1–24, vol. 7, No. 1.

IBM. "Automated Problem Reporting." IBM Technical Disclosure Bulletin, Nov. 1989, pp. 466–468, vol. 32, No. 6A.

*Primary Examiner*—Robert Beausoliel
*Assistant Examiner*—Gabriel L. Chu
(74) *Attorney, Agent, or Firm*—Swernofsky Law Group PC

(57) ABSTRACT

A method and system for computer assisted automatic error detection and diagnosis of file servers. Software modules periodically and continuously review monitoring statistics gathered by the file server regarding its operation. The monitoring statistics are processed by a pattern matching system and a rule-based inference system. Software modules augment known network protocols, by manipulating parameters of lower-level protocols using different higher-level protocols. Using the higher-level protocols, software modules determine if the selected parameters for the lower-level protocols are correct. Software modules track hardware and software configuration changes to the file server, and relate changes in known monitoring statistics to timing of those hardware and software configuration changes.

30 Claims, 5 Drawing Sheets

U.S. PATENT DOCUMENTS

| | | | | |
|---|---|---|---|---|
| 5,623,598 A | * | 4/1997 | Voigt et al. | 714/47 |
| 5,649,152 A | | 7/1997 | Ohran et al. | 395/441 |
| 5,649,196 A | | 7/1997 | Woodhill et al. | 395/620 |
| 5,655,081 A | * | 8/1997 | Bonnell et al. | 709/202 |
| 5,664,106 A | * | 9/1997 | Caccavale | 709/224 |
| 5,666,481 A | * | 9/1997 | Lewis | 714/4 |
| 5,668,944 A | * | 9/1997 | Berry | 714/47 |
| 5,668,958 A | | 9/1997 | Bendert et al. | 710/128 |
| 5,675,782 A | | 10/1997 | Montague et al. | 395/609 |
| 5,680,541 A | | 10/1997 | Kurosu et al. | |
| 5,684,945 A | * | 11/1997 | Chen et al. | 714/20 |
| 5,689,701 A | | 11/1997 | Ault et al. | 395/610 |
| 5,699,350 A | * | 12/1997 | Kraslavsky | 370/254 |
| 5,704,036 A | * | 12/1997 | Brownmiller et al. | 370/907 |
| 5,721,916 A | | 2/1998 | Pardikar | 395/617 |
| 5,737,523 A | | 4/1998 | Callaghan et al. | 395/187.01 |
| 5,745,669 A | * | 4/1998 | Hugard et al. | 714/3 |
| 5,751,964 A | * | 5/1998 | Ordanic et al. | 709/224 |
| 5,758,071 A | * | 5/1998 | Burgess et al. | 709/220 |
| 5,761,669 A | | 6/1998 | Montague et al. | 707/103 |
| 5,768,501 A | * | 6/1998 | Lewis | 714/48 |
| 5,784,359 A | * | 7/1998 | Bencheck et al. | 370/244 |
| 5,787,409 A | | 7/1998 | Seiffert et al. | |
| 5,819,292 A | | 10/1998 | Hitz et al. | 707/203 |
| 5,819,310 A | | 10/1998 | Vishlitzky | 711/114 |
| 5,825,877 A | | 10/1998 | Dan et al. | 380/4 |
| 5,835,953 A | | 11/1998 | Ohran | 711/162 |
| 5,876,278 A | | 3/1999 | Cheng | 454/184 |
| 5,890,959 A | | 4/1999 | Pettit et al. | 454/184 |
| 5,893,083 A | * | 4/1999 | Eshghi et al. | 706/45 |
| 5,915,087 A | | 6/1999 | Hammond et al. | 395/187.01 |
| 5,920,719 A | * | 7/1999 | Sutton et al. | 717/130 |
| 5,926,621 A | | 7/1999 | Schwarz et al. | |
| 5,931,935 A | | 8/1999 | Cabrera et al. | 710/260 |
| 5,933,564 A | * | 8/1999 | Pavlath | 714/26 |
| 5,963,962 A | | 10/1999 | Hitz et al. | 707/202 |
| 5,983,364 A | | 11/1999 | Bortcosh et al. | |
| 5,996,086 A | | 11/1999 | Delaney et al. | 714/4 |
| 5,999,943 A | | 12/1999 | Nori et al. | 707/104 |
| 6,006,016 A | * | 12/1999 | Faigon et al. | 714/48 |
| 6,012,100 A | * | 1/2000 | Frailong et al. | 709/250 |
| 6,016,553 A | * | 1/2000 | Schneider et al. | 714/21 |
| 6,057,757 A | * | 5/2000 | Arrowsmith et al. | 340/506 |
| 6,058,494 A | * | 5/2000 | Gold et al. | 714/42 |
| 6,072,777 A | * | 6/2000 | Bencheck et al. | 370/244 |
| 6,148,338 A | * | 11/2000 | Lachelt et al. | 709/224 |
| 6,173,417 B1 | * | 1/2001 | Merrill | 714/15 |
| 6,173,420 B1 | * | 1/2001 | Sunkara et al. | 714/38 |
| 6,181,700 B1 | * | 1/2001 | Doi | 370/252 |
| 6,185,577 B1 | * | 2/2001 | Nainani et al. | 707/202 |
| 6,189,114 B1 | * | 2/2001 | Orr | 714/25 |
| 6,237,114 B1 | * | 5/2001 | Wookey et al. | 714/47 |
| 6,240,511 B1 | * | 5/2001 | Blumenau et al. | 713/1 |
| 6,282,701 B1 | | 8/2001 | Wygodny et al. | |
| 6,295,611 B1 | * | 9/2001 | Connor et al. | 714/15 |
| 6,324,659 B1 | * | 11/2001 | Pierro | 714/48 |
| 6,327,677 B1 | * | 12/2001 | Garg et al. | 709/224 |
| 6,338,151 B1 | * | 1/2002 | Yudenfriend et al. | 714/47 |
| 6,405,327 B1 | * | 6/2002 | Sipple et al. | 714/39 |
| 6,415,372 B1 | * | 7/2002 | Zakai et al. | 711/165 |
| 6,449,739 B1 | * | 9/2002 | Landan | 714/47 |
| 6,460,070 B1 | * | 10/2002 | Turek et al. | 709/202 |
| 6,460,147 B1 | * | 10/2002 | Cox | 714/38 |
| 6,470,464 B1 | * | 10/2002 | Bertram et al. | 714/37 |
| 6,477,531 B1 | * | 11/2002 | Sullivan et al. | 707/10 |
| 6,484,206 B1 | * | 11/2002 | Crump et al. | 709/227 |
| 6,490,690 B1 | * | 12/2002 | Gusler et al. | 714/4 |
| 6,496,282 B1 | * | 12/2002 | Malik | 358/405 |
| 6,545,981 B1 | | 4/2003 | Garcia et al. | |
| 6,772,375 B1 | | 8/2004 | Banga | |
| 2003/0046271 A1 | | 3/2003 | Eastham | |

* cited by examiner

COMPUTER ASSISTED AUTOMATIC ERROR DETECTION AND DIAGNOSIS OF FILE SERVERS

BACKGROUND OF THE INVENTION

1. Field of the Invention

This invention relates to computer assisted automatic error detection and diagnosis of file servers, such as for a networked file server.

2. Related Art

Network file servers are subject to errors and other failures (such as less-than-expected levels of performance), including those arising from hardware failure, software error, erroneous configuration, or mismatch between configuration and usage. Many of these errors and other failures are similar to those that are common for general-purpose computer systems, and these would therefore be subject to similar forms of error detection and diagnosis by a user of the system. However, many network file servers are designed for minimal user intervention, and are specifically intended to have extremely simple user interfaces. One such group of easy-to-use network file servers are called "Network Appliance"™ file servers, for which the model of use is that the device is as easy to use as a common toaster.

One problem with known systems is that relative ease of use is often coupled with relatively unsophisticated users. Error detection and diagnosis by relatively unsophisticated users is subject to the drawback that relatively unsophisticated users are relatively unsophisticated in the use of error detection and diagnosis techniques. Thus, forms of error detection and diagnosis that are acceptable for general-purpose computer systems are not nearly as suitable for network file servers where one of the most important purposes is to be easy-to-use.

Accordingly, it would be advantageous to provide a technique for computer assisted automatic error detection and diagnosis of file servers that is not subject to drawbacks of the known art.

SUMMARY OF THE INVENTION

The invention provides a method and system for computer assisted automatic error detection and diagnosis of file servers. In a preferred embodiment, the file server includes diagnostic software modules for (1) periodic and continuous interpretation of monitoring statistics, (2) augmentation of known network protocols, (3) cross-layer analysis of monitoring statistics, and (4) tracking of hardware and software configuration changes.

In a first aspect of the invention, the diagnostic software modules periodically and continuously review monitoring statistics gathered by the file server regarding its operation. These monitoring statistics can include a wide variety of values gathered by software modules at disparate levels within the operating system of the file server. The collection of monitoring statistics is processed by a pattern matching system and a rule-based inference system. In a preferred embodiment, the pattern matching system and rule-based inference system are responsive to a use profile for the file server, such as whether the file server is being used for an ISP, a development environment, a mail server, or otherwise.

In a second aspect of the invention, the diagnostic software modules are capable of augmenting known network protocols, by manipulating parameters of lower-level protocols using different higher-level protocols. The diagnostic software modules can manipulate known parameters of the lower-level protocols in rapid succession, so as to try a large number of combinations of protocol parameters. Using the higher-level protocols, the diagnostic software modules can determine if the selected parameters for the lower-level protocols are correct.

In a third aspect of the invention, the diagnostic software modules are capable of imposing sequential and combined constraints on diagnosis of possible errors, with reference to known logical coupling between monitoring statistics gathered at multiple logical levels of software modules within the file server. In a preferred embodiment, constraints from multiple logical levels are chained together so as to limit the number of possible errors deduced as possible from the various monitoring statistics to a relatively small number.

In a fourth aspect of the invention, the diagnostic software modules are capable of tracking hardware and software configuration changes to the file server, and relating changes in known monitoring statistics to timing of those hardware and software configuration changes. In a preferred embodiment, the diagnostic software modules are capable of determining the configuration change most likely to be responsible for a computer assisted diagnosed error, and of suggesting activities to reverse the hardware and software configuration changes so as to place the file server in an operating state.

The invention provides an enabling technology for a wide variety of applications for computer assisted automatic error detection and diagnosis of file servers, so as to obtain substantial advantages and capabilities that are novel and non-obvious in view of the known art. Examples described below primarily relate to networked file servers, but the invention is broadly applicable to many different types of automated software systems.

DETAILED DESCRIPTION OF THE PREFERRED EMBODIMENT

Figure 1:
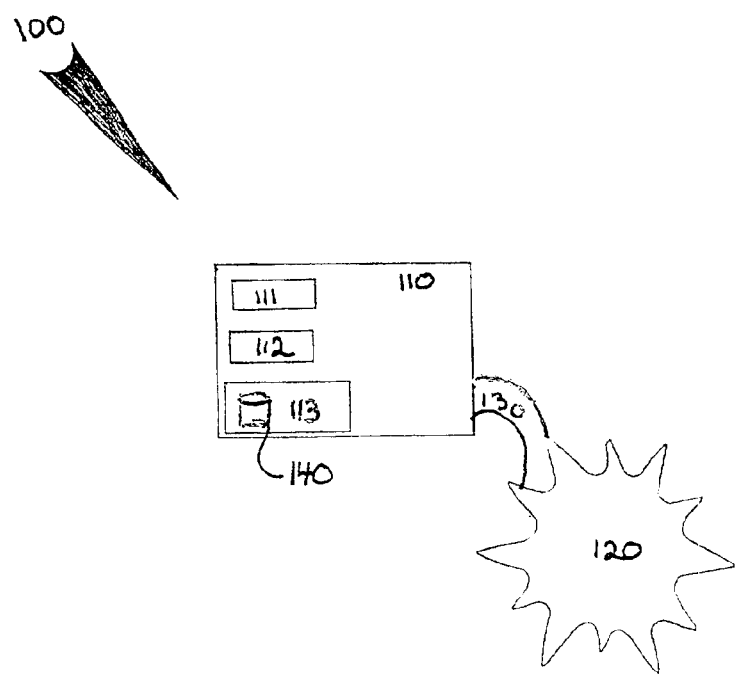
FIG. 1 shows a block diagram of a system for computer assisted automatic error detection and diagnosis of file servers.

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Lexicography

The following terms refer or relate to aspects of the invention as described below. The descriptions of general meanings of these terms are not intended to be limiting, only illustrative.

client and server—in general, these terms refer to a relationship between two devices, particularly to their relationship as client and server, not necessarily to any particular physical devices.

For example, but without limitation, a particular client device in a first relationship with a first server device, can serve as a server device in a second relationship with a second client device. In a preferred embodiment, there are generally a relatively small number of server devices servicing a relatively larger number of client devices.

client device and server device—in general, these terms refer to devices taking on the role of a client device or a server device in a client-server relationship (such as an HTTP web client and web server). There is no particular requirement that any client devices or server devices must be individual physical devices. They can each be a single device, a set of cooperating devices, a portion of a device, or some combination thereof.

For example, but without limitation, the client device and the server device in a client-server relation can actually be the same physical device, with a first set of software elements serving to perform client functions and a second set of software elements serving to perform server functions.

configuration changes—in general, information regarding changes to a configuration of the file server.

cross-layer analysis—in general, a technique for applying a large number of combinations of diagnostic constraints, so as to determine a set of errors or other faults are not compatible with the set of current monitoring statistics.

diagnostic constraint—in general, a functional or logical constraint on possible errors or other failures, due to functional or logical structure of the file server or its operating system.

diagnostic software module—in general, a software module in the file server used for performing computer assisted automatic error detection and diagnosis.

error detection and diagnosis—in general, a technique for detecting errors and other failures, and for determining a likely cause thereof.

lower-level and higher-level protocols—in general, these terms refer to a relationship between two protocols, particularly to their relationship as a higher-level protocol which relies on operation of a lower-level protocol and which is able to alter parameters of the lower-level protocol, not necessarily to any particular protocols.

manipulating parameters—in general, a technique for using a higher-level protocol to determine whether a lower-level protocol is operating relatively efficiently using a set of selected parameters for the lower-level protocol, and using the lower-level protocol to repeatedly and rapidly alter those selected parameters so as to find an optimal set of selected parameters.

monitoring statistics—in general, information regarding performance of the file server or other device.

network protocol—in general, a technique for communication between devices, such as for example between (a) the file server or other device and (b) a point external to the file server or other device.

pattern matching—in general, a technique for comparing a set of monitoring statistics against a selected pattern known to be related to an error or other fault.

periodic and continuous interpretation—in general, repeated and rapid review of monitoring statistics, so as to identify errors or other faults rapidly and as early as possible protocol augmentation—in general, a technique for using a higher-level protocol to determine whether a lower-level protocol is operating relatively efficiently using a set of selected parameters for the lower-level protocol, and using the lower-level protocol to repeatedly and rapidly alter those selected parameters so as to find an optimal set of selected parameters.

rule-based inference system—in general, a technique for drawing factual conclusions from monitoring statistics and other known facts, so as to determine the presence or absence of an error or other fault.

sequential and combined constraints on diagnosis—in general, a technique for applying a large number of combinations of diagnostic constraints, so as to determine a set of errors or other faults are not compatible with the set of current monitoring statistics usage profile—in general, information regarding a pattern or profile of use of a file server or other device.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 shows a block diagram of a system for computer assisted automatic error detection and diagnosis of file servers.

A system 100 includes a file server (or other device) 110, a communication network 120, a network interface 130, and a database 140.

The file server (or other device) 110 includes a computer having a processor, program and data memory, mass storage, a presentation element, and an input element, and coupled to the communication network 120. As used herein, the term "computer" is intended in its broadest sense, and includes any device having a programmable processor or otherwise falling within the generalized Turing machine paradigm. The mass storage can include any device for storing relatively large amounts of information, such as magnetic disks or tapes, optical devices, magneto-optical devices, or other types of mass storage.

The file server 110 includes operating system software 111, including an appliance operating system 112 for controlling the file server 110 and performing its file server operations, and a diagnostic software module 113 for performing computer assisted automatic error detection and diagnosis.

The diagnostic software module 113 includes software modules for error detection and diagnosis (further described with regard to FIG. 2, FIG. 3, FIG. 4, and FIG. 5), and is coupled to the database 140 for storing and retrieving statistical and other information.

The communication network 120 includes any technique for sending information between the file server 110 and at least one point outside the file server 110. In a preferred embodiment, the communication network 120 includes a computer network, such as an Internet, intranet, extranet, or a virtual private network. In alternative embodiments, the communication network 120 can include a direct communication line, a switched network such as a telephone network, or some combination thereof.

The network interface 130 includes a communication link between the file server 10 and the communication network 120.

The database 140 includes memory or mass storage in which monitoring statistics and other information about the file server 110 can be recorded and retrieved therefrom.

Method of Operation (Interpretation of Monitoring Statistics)

Figure 2:
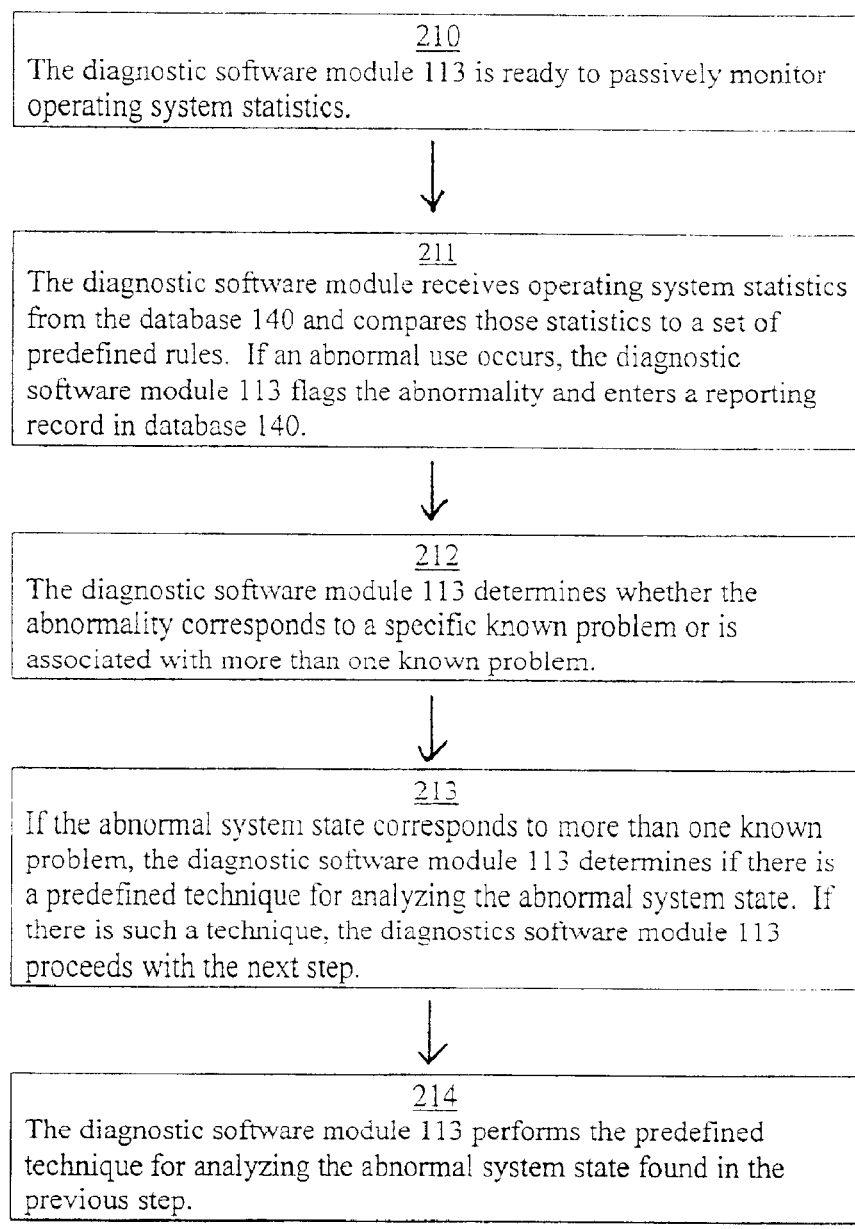
FIG. 2 shows a process flow diagram of a first method for operating a system for computer assisted automatic error detection and diagnosis of file servers, including periodic and continuous interpretation of monitoring statistics.

FIG. 2 shows a process flow diagram of a first method for operating a system for computer assisted automatic error detection and diagnosis of file servers, including periodic and continuous interpretation of monitoring statistics.

A method 200 includes a set of flow points and a set of steps. The system 100 performs the method 200. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

At a flow point 210, the diagnostic software module 113 is ready to passively monitor operating system statistics.

At a step 211, the diagnostic software module 113 receives operating system statistics from the database 140 and compares those operating system statistics against a set of predefined rules regarding statistical aberrations. If the operating system statistics fall within the predefined rules, thus indicating an abnormal system state, the diagnostic software module 113 flags that abnormal system state, enters a reporting record in the database 140, and reports the detected abnormal system state and its associated operating system statistics to an operator (not shown).

In a preferred embodiment, the predefined rules regarding statistical aberrations include both (a) pattern matching, in which the diagnostic software module 113 compares the monitoring statistics against selected patterns known to be related to an errors or other faults, and (b) rule-based inference, in which the diagnostic software module 113 draws factual conclusions from monitoring statistics and other known facts, so as to determine the presence or absence of errors or other faults.

In a preferred embodiment, the predefined rules regarding statistical aberrations are responsive to a usage pattern for the file server, as recorded in the database 140 or otherwise. For example, the file server can be primarily used as for an ISP, a development environment, a mail server, or otherwise. The usage pattern for the file server could reflect such information, preferably including an expected number of distinct users, an expected number of distinct files, an expected size for typical files, and an expected duration of existence for distinct files or file-usage sessions.

At a step 212, the diagnostic software module 113 determines, using the predefined rules, whether the abnormal system state corresponds to a specific known problem, or is associated with more than one known problem. If the abnormal system state corresponds to a specific known problem, the diagnostic software module 113 so indicates and reports the specific known problem to the operator.

At a step 213, if the abnormal system state was determined in the previous step to correspond to a set of more than one known problem, the diagnostic software module 113 determines if there is a predefined technique for analyzing the abnormal system state. If there is such a predefined technique, the diagnostic software module 113 proceeds with the next step.

At a step 214, the diagnostic software module 113 performs the predefined technique for analyzing the abnormal system state found in the previous step.

After this step, the method 200 has performed one round of passively monitoring operating system statistics, and is ready to perform another such round so as to continuously monitor operating system statistics.

The method 200 is performed one or more times starting from the flow point 210 and continuing therefrom. In a preferred embodiment, the diagnostic software module 113 repeatedly performs the method 200, starting from the flow point 210 and continuing therefrom, so as to review monitoring statistics gathered by the file server periodically and continuously.

Method of Operation (Augmentation of Network Protocols)

Figure 3:
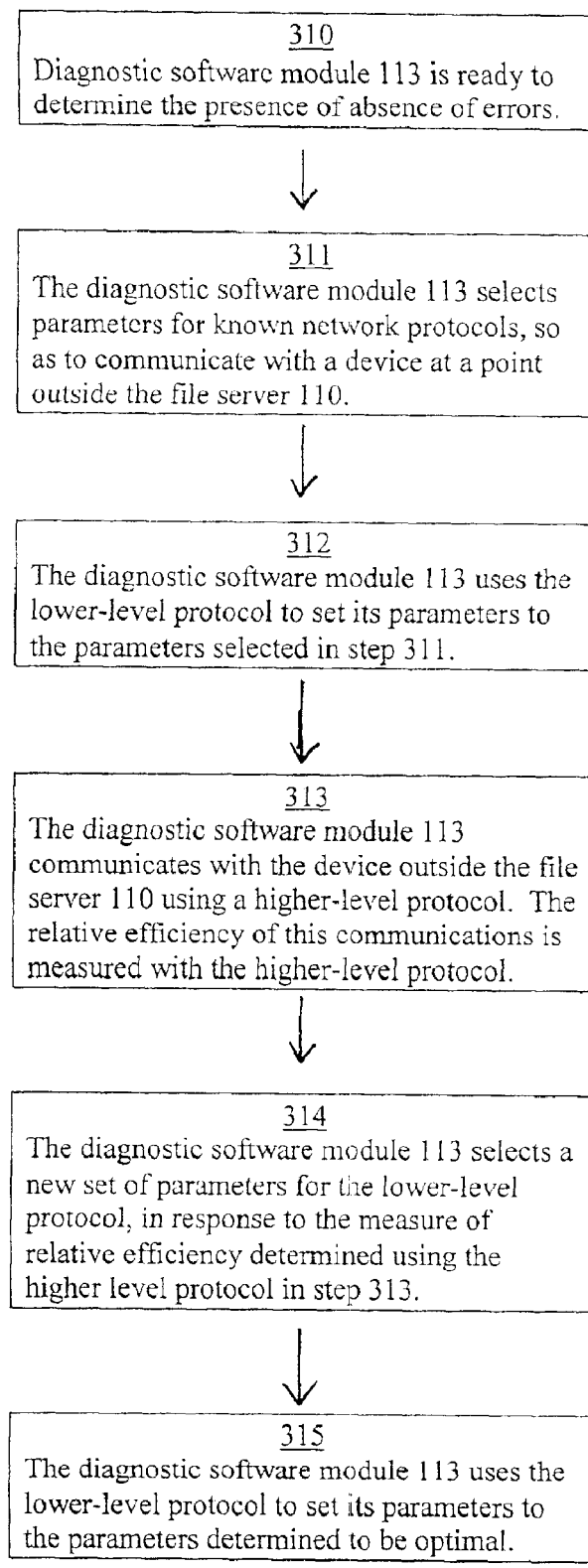
FIG. 3 shows a process flow diagram of a second method for operating a system for computer assisted automatic error detection and diagnosis of file servers, including augmentation of known network protocols.

FIG. 3 shows a process flow diagram of a second method for operating a system for computer assisted automatic error detection and diagnosis of file servers, including augmentation of known network protocols.

A method 300 includes a set of flow points and a set of steps. The system 100 performs the method 300. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

At a flow point 310, the diagnostic software module 113 is ready to determine the presence or absence of errors or other faults, using protocol augmentation of known network protocols.

At a step 311, the diagnostic software module 113 selects parameters for known network protocols, so as to communicate with a device at a point outside the file server 110. In selecting these parameters, the diagnostic software module 113 attempts to choose parameters that match with the device outside the file server 110, so as to achieve relatively efficient communication.

At a step 312, the diagnostic software module 113 uses the lower-level protocol to set its parameters to the parameters selected in the previous step.

At a step 313, the diagnostic software module 113 communicates with the device outside the file server 110 using a higher-level protocol, and uses the higher-level protocol to measure the relative efficiency of communication therewith.

At a step 314, the diagnostic software module 113 selects a new set of parameters for the lower-level protocol, in response to the measure of relative efficiency determined using the higher-level protocol in the previous step.

The diagnostic software module 113 performs the step 312, the step 313, and the step 314, repeatedly and rapidly, so as to try a large number of combinations of protocol parameters. The diagnostic software module 113 thus determines which selected parameters are optimal.

At a step 315, the diagnostic software module 113 uses the lower-level protocol to set its parameters to the parameters determined to be optimal.

After this step, the method 300 has set the optimal parameters for the lower-level protocol.

The method 300 can be performed one or more times starting from the flow point 310 and continuing therefrom.

Method of Operation (Cross-Layer Analysis)

Figure 4:
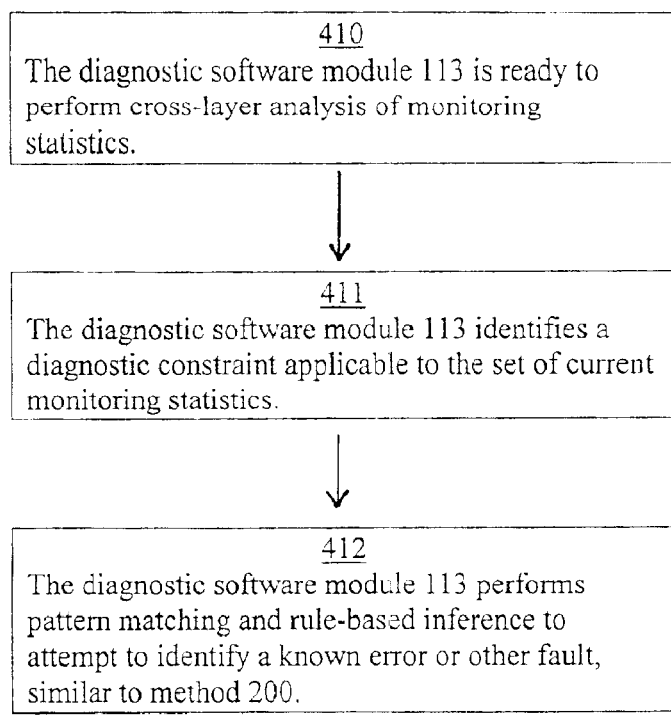
FIG. 4 shows a process flow diagram of a third method for operating a system for computer assisted automatic error detection and diagnosis of file servers, including cross-layer analysis of monitoring statistics.

FIG. 4 shows a process flow diagram of a third method for operating a system for computer assisted automatic error detection and diagnosis of file servers, including cross-layer analysis of monitoring statistics.

A method 400 includes a set of flow points and a set of steps. The system 100 performs the method 400. Although the method 400 is described serially, the steps of the method 400 can be performed by separate elements in conjunction or in parallel, whether asynchronously, in a pipelined manner, or otherwise. There is no particular requirement that the method 400 be performed in the same order in which this description lists the steps, except where so indicated.

At a flow point 410, the diagnostic software module 113 is ready to perform cross-layer analysis of monitoring statistics.

At a step 411, the diagnostic software module 113 identifies a diagnostic constraint applicable to the set of current monitoring statistics.

At a step 412, the diagnostic software module 113 performs pattern matching and rule-based inference to attempt to identify a known error or other fault, similar to the method 200.

The diagnostic software module 1113 performs the step 411 and the step 412 repeatedly and rapidly, so as to apply a large number of combinations of diagnostic constraints. The diagnostic software module 113 thus determines a set of errors or other faults are not compatible with the set of current monitoring statistics.

In a preferred embodiment, the diagnostic software module 113 continues to apply combinations of diagnostic constraints until the set of errors or other faults is reduced to only a few possibilities.

After this step, the method 400 has used cross-layer analysis of monitoring statistics to restrict the set of possible errors or other faults.

The method 400 can be performed one or more times starting from the flow point 410 and continuing therefrom.

Method of Operation (Tracking Configuration Changes)

Figure 5:
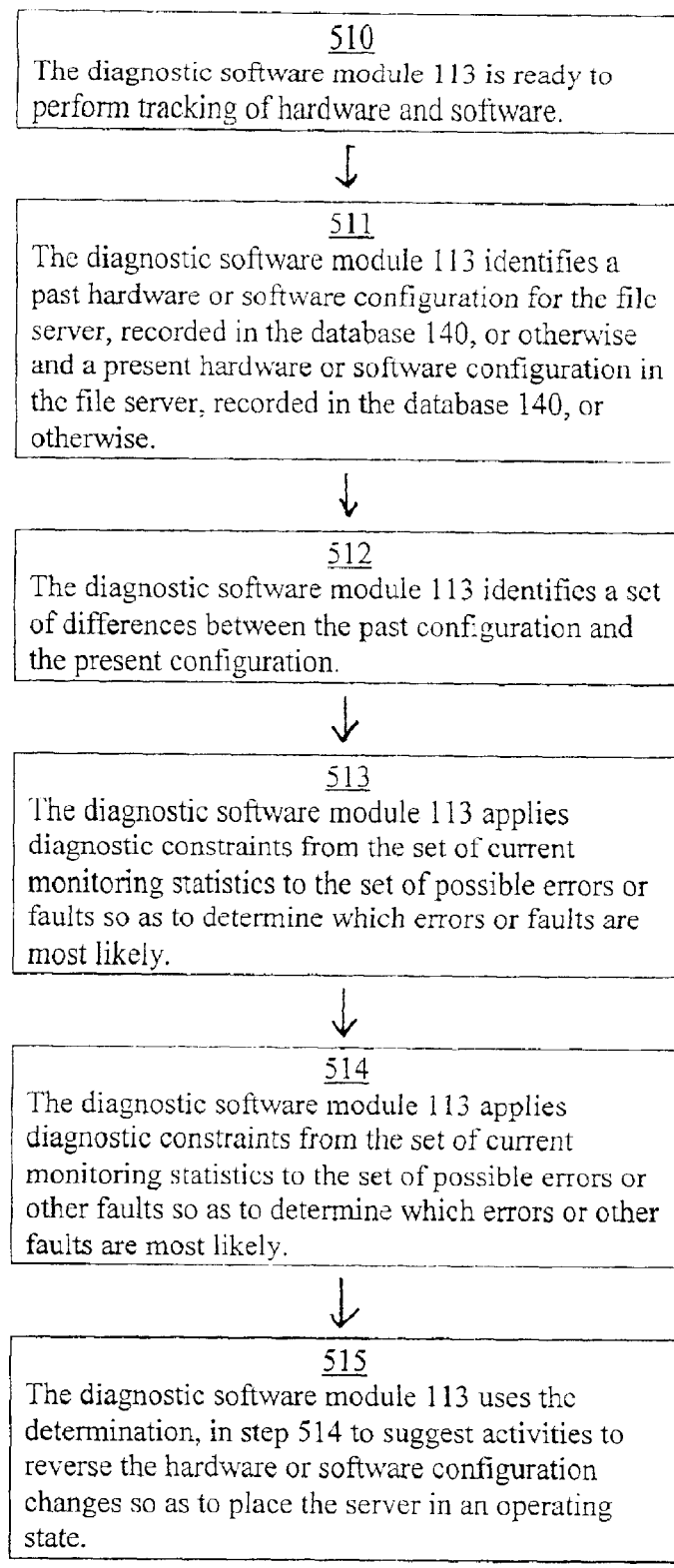
FIG. 5 shows a process flow diagram of a fourth method for operating a system for computer assisted automatic error detection and diagnosis of file servers, including tracking of hardware and software configuration changes.

FIG. 5 shows a process flow diagram of a fourth method for operating a system for computer assisted automatic error detection and diagnosis of file servers, including tracking of hardware and software configuration changes.

A method 500 includes a set of flow points and a set of steps. The system 100 performs the method 500. Although the method 500 is described serially, the steps of the method 500 can be performed by separate elements in conjunction or in parallel, whether asynchronously, in a pipelined manner, or otherwise. There is no particular requirement that the method 500 be performed in the same order in which this description lists the steps, except where so indicated.

At a flow point 510, the diagnostic software module 113 is ready to perform tracking of hardware and software configuration changes.

At a step 511, the diagnostic software module 113 identifies a past hardware or software configuration for the file server, recorded in the database 140 or otherwise, and a present hardware or software configuration for the file server, recorded in the database 140 or otherwise.

At a step 512, the diagnostic software module 113 identifies a set of differences between the past configuration and the present configuration. The diagnostic software module relates changes in known monitoring statistics to timing of those configuration changes.

At a step 513, the diagnostic software module 113 identifies a set of possible errors or other faults associated with the set of differences identified in the previous step.

At a step 514, the diagnostic software module 113 applies diagnostic constraints from the set of current monitoring statistics to the set of possible errors or other faults, so as to determine which errors or other faults are most likely.

At a step 515, the diagnostic software module 113 uses the determination, in the previous step, of which errors or other faults are most likely, to suggest activities to reverse the hardware or software configuration changes so as to place the file server in an operating state.

After this step, the method 500 has used tracking of hardware and software configuration changes to restrict the set of possible errors or other faults.

The method 500 can be performed one or more times starting from the flow point 510 and continuing therefrom.

Generality of the Invention

The invention has general applicability to various fields of use, not necessarily related to the services described above. For example, these fields of use can include other "appliance"-type devices other than file servers.

Other and further applications of the invention in its most general form, will be clear to those skilled in the art after perusal of this application, and are within the scope and spirit of the invention.

Technical Appendix

The technical appendix enclosed with this application is hereby incorporated by reference as if fully set forth herein, and forms a part of the disclosure of the invention and its preferred embodiments.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including steps of repeatedly reviewing monitoring statistics regarding operation of a file server, said steps of reviewing being performed at least as often as a selected time period; and processing said monitoring statistics using a diagnostic software module on said file server, in response to said steps of repeatedly reviewing;

wherein said diagnostic software module diagnoses a behavior of said file server to determine a specific problem or problems by comparing said monitoring statistics to rules or patterns representing abnormal states of operation for said file server; and wherein said monitoring statistics include information gathered by at least first and second software modules, said first and second software modules being disposed at differing protocol levels within an operating system of said file server.

2. A method as in claim 1, wherein said diagnostic software module includes a pattern matching system and a rule-based inference system.

3. A method as in claim 1, wherein said monitoring statistics include information gathered by at least one software module within an operating system of said file server.

4. A method as in claim 1, wherein said selected time period is less than 10 seconds.

5. A method as in claim 1, wherein said steps of processing are responsive to a usage profile for said file server.

6. A method as in claim 5, wherein said usage profile includes information regarding whether use of said file server includes usage as an ISP, a development environment, or a mail server.

7. A method as in claim 1, further including steps of
selecting parameters for said differing protocol levels;
using said diagnostic software module to determine a measure of efficiency for said file server using a higher one of said differing protocol levels; and
selecting new parameters for a lower one of said differing protocol levels in response to said measure of efficiency.

8. A method, including steps of
tracking configuration changes to a file server;
maintaining monitoring statistics for said file server:
identifying a relationship between changes in said monitoring statistics for said file server and timing of said configuration changes;
identifying possible errors or other faults for said server associated with relating said changes in said monitoring statistics to timing of said configuration changes;
determining, in response to said relationship between said changes in monitoring statistics and said timing of configuration changes, which of said possible errors or other faults is most likely; and
identifying, in response to which of said possible errors or other faults is most likely, one or more of said configuration changes.

9. A method as in claim 8, including steps of suggesting activities to reverse said configuration changes so as to place said file server in an operating state.

10. A method as in claim 8, wherein said configuration changes include hardware and software configuration changes.

11. A file server comprising:
an interface to a network;
mass storage accessible through said interface;
a processor that controls access to said mass storage; and
a memory that stores information including instructions executable by said processor, said instructions including steps of (a) repeatedly reviewing monitoring statistics regarding operation of said file server, said steps of reviewing being performed at least as often as a selected time period, and (b) processing said monitoring statistics using a diagnostic software module on said file server, in response to said steps of repeatedly reviewing;
wherein said diagnostic software module diagnoses a behavior of said file server to determine a specific problem or problems by comparing said monitoring statistics to rules or patterns representing abnormal states of operation for said file server; and
wherein said monitoring statistics include information gathered by at least first and second software modules, said first and second software modules being disposed at differing protocol levels within an operating system of said file server.

12. A file server as in claim 11, wherein said diagnostic software module includes a pattern matching system and a rule-based inference system.

13. A file server as in claim 11, wherein said monitoring statistics include information gathered by at least one software module within an operating system of said file server.

14. A file server as in claim 11, wherein said selected time period is less than 10 seconds.

15. A file server as in claim 11, wherein said steps of processing are responsive to a usage profile for said file server.

16. A file server as in claim 15, wherein said usage profile includes information regarding whether use of said file server includes usage as an ISP, a development environment, or a mail server.

17. A file server as in claim 11, said instructions further comprising steps of: (c) selecting parameters for said differing protocol levels; (d) using said diagnostic software module to determine a measure of efficiency for said file server using a higher one of said differing protocols levels; and (e) selecting new parameters for a lower one of said differing protocol levels in response to said measure of efficiency.

18. A file server comprising:
an interface to a network;
mass storage accessible through said interface;
a processor that controls access to said mass storage; and
a memory that stores information including instructions executable by said processor, said instructions including steps of (a) tracking configuration changes to said file server, (b) maintaining monitoring statistics for said file server, (c) identifying a relationship between changes in said monitoring statistics for said file server and timing of said configuration changes, (d) identifying possible errors or other faults for said server associated with said changes in said monitoring statistics, (e) determining, in response to said relationship between said changes in monitoring statistics and said timing of configuration changes, which of said possible errors or other faults is most likely, and (f) identifying, in response to which of said possible errors or other faults is most likely, one or more of said configuration changes.

19. A file server as in claim 18, wherein said instructions further include steps of suggesting activities to reverse said configuration changes so as to place said file server in an operating state.

20. A file server as in claim 18, wherein said configuration changes include hardware and software configuration changes.

21. A memory storing information including instructions, the instructions executable by a processor to control a file server, the instructions including steps of
repeatedly reviewing monitoring statistics regarding operation of said file server, said steps of reviewing being performed at least as often as a selected time period; and
processing said monitoring statistics using a diagnostic software module on said file server, in response to said steps of repeatedly reviewing;
wherein said diagnostic software module diagnoses a behavior of said file server to determine a specific problem or problems by comparing said monitoring statistics to rules or patterns representing abnormal states of operation for said file server; and
wherein said monitoring statistics include information gathered by at least first and second software modules, said first and second software modules being disposed at differing protocol levels within an operating system of said file server.

22. A memory as in claim 21, wherein said diagnostic software module includes a pattern matching system and a rule-based inference system.

23. A memory as in claim 21, wherein said monitoring statistics include information gathered by at least one software module within an operating system of said file server.

24. A memory as in claim 21, wherein said selected time period is less than 10 seconds.

25. A memory as in claim 21, wherein said steps of processing are responsive to a usage profile for said file server.

26. A memory as in claim 25, wherein said usage profile includes information regarding whether use of said file server includes usage as an ISP, a development environment, or a mail server.

27. A memory as in claim 21, the instructions further including steps of:

selecting parameters for said differing protocol levels;

using said diagnostic software module to determine a measure of efficiency for said file server using a higher one of said differing protocol levels; and selecting new parameters for a lower one of said differing protocol levels in response to said measure of efficiency.

28. A memory storing information including instructions, the instructions executable by a processor to control a file server, the instructions including steps of tracking configuration changes to a file server;

maintaining monitoring statistics for said file server;

identifying a relationship between changes in said monitoring statistics for said file server and timing of said configuration changes;

identifying possible errors or other faults for said server associated with said changes in said monitoring statistics;

determining in response to said relationship between said changes in monitoring statistics and said timing of configuration changes, which of said possible errors or other faults is most likely; and identifying, in response to which of said possible errors or other faults is most likely, one or more of said configuration changes.

29. A memory as in claim 28, wherein said instructions further include steps of suggesting activities to reverse said configuration changes so as to place said file server in an operating state.

30. A memory as in claim 28, wherein said configuration changes include hardware and software configuration changes.

* * * * *